Nov. 7, 1939.                J. MAST                2,179,076
MACHINE FOR MAKING PIE DOUGH OR LIKE PASTRIES
                Filed Dec. 9, 1938        2 Sheets-Sheet 1
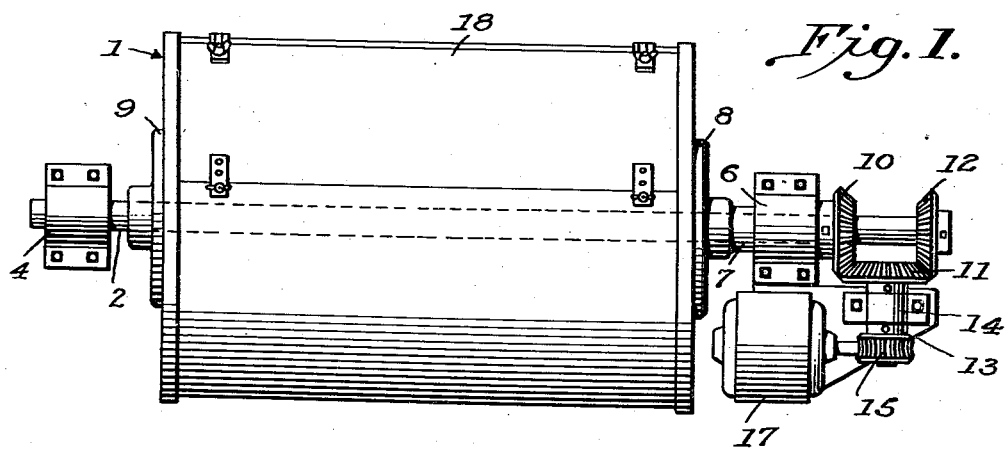
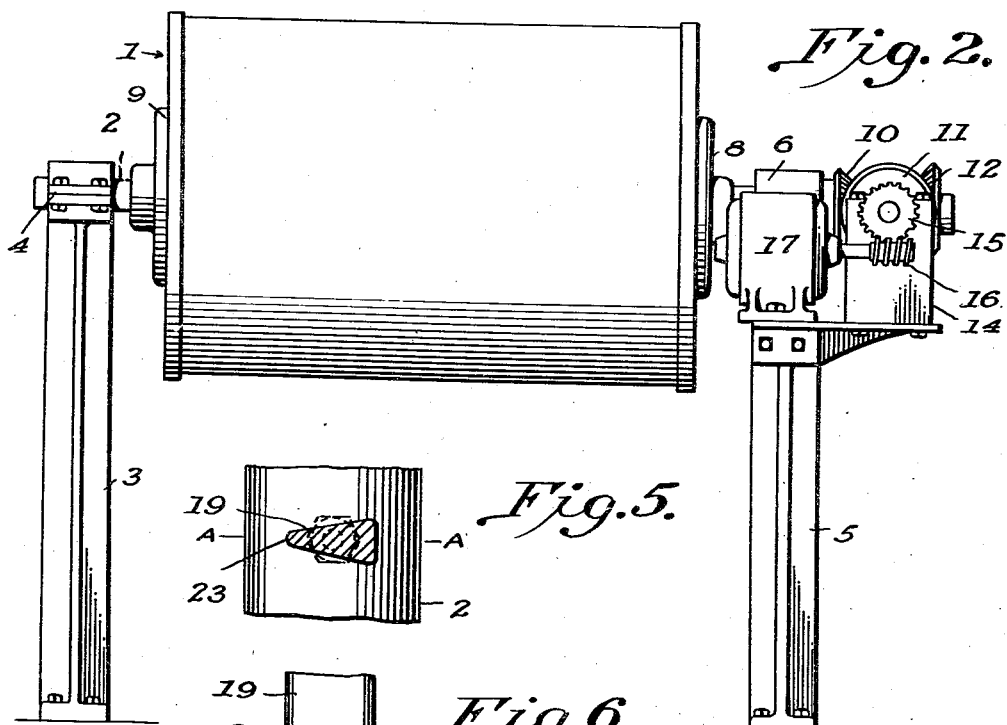
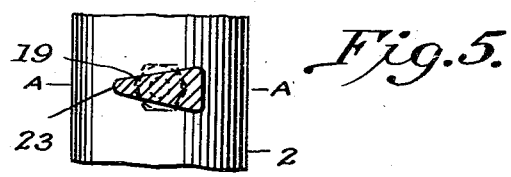
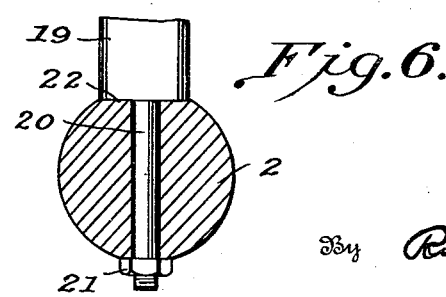
Inventor
JOSEPH MAST
By Richard G. Radue
              Attorney

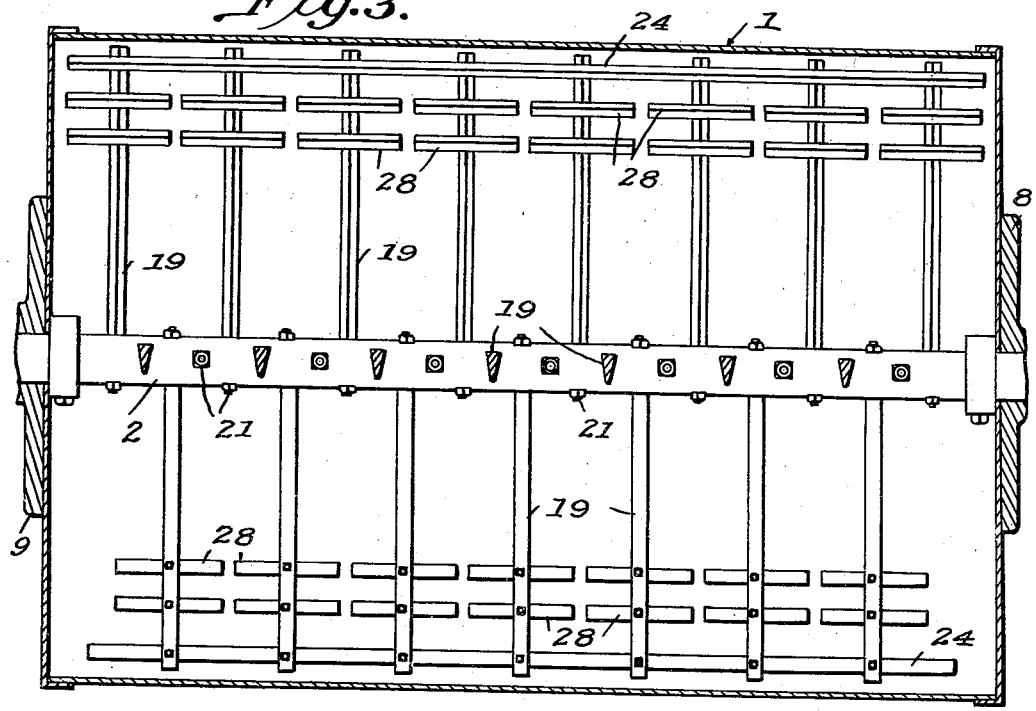
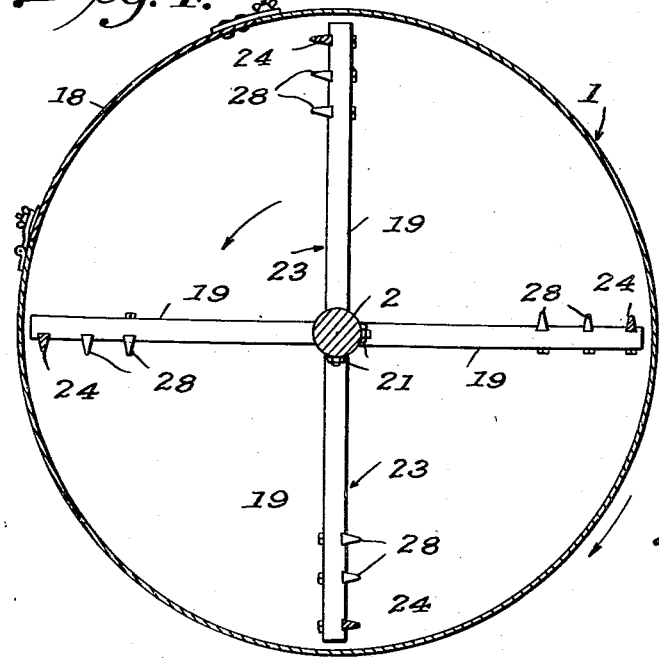
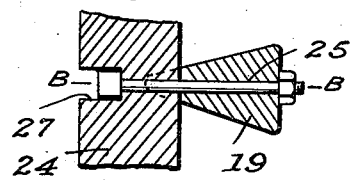

Patented Nov. 7, 1939

2,179,076

UNITED STATES PATENT OFFICE 2,179,076

MACHINE FOR MAKING PIE DOUGH OR LIKE PASTRIES

Joseph Mast, Phoenix, Ariz.

Application December 9, 1938, Serial No. 244,833

2 Claims. (Cl. 259—85)

This invention relates to a machine for making pie dough or like pastries. The mixing problem thus presented is a peculiar one. It is of primary importance that pie dough be mixed without beating or kneading and that a generous amount of air be included in the dough as finally mixed. Unless these precautions are scrupulously observed, the pie crust as baked will be heavy and tough instead of light and flaky. For these reasons, among others, no commercial machine has been produced hitherto which could perform this operation satisfactorily and efficiently.

It is, therefore, the main object of this invention to provide a machine for this purpose which will mix pie dough or the like without beating or kneading, and in a relatively short time.

Another object of the present invention is to provide means whereby the ingredients of the pie dough mix can be stirred and cut so as to produce a perfect pie dough. A further purpose is to eliminate the objectionable heating of the dough which accompanies hand mixing.

In attaining these objects it has been necessary to devise a machine which will not drag through the dough, but will instead cut through it at a great number of places.

The essential elements of the machine of this invention are a mixing drum, a stirring shaft carrying knife-like arms and strips coaxially arranged within the drum, and means for producing opposite rotating movement of the drum and stirring shaft.

Features of improvement are to be recognized in the specific arrangement of knife-like arms and the attached knife strips, and in the relations of the knife arms and strips to the mixing drum in which they are mounted for rotation.

Another feature of the invention is the readily detachable connections which have been provided between the revolving shaft and the knife-like arms and between the arms and the knife strips which are attached thereto, to facilitate the ready removal of the knife arms and strips for cleaning and other purposes.

Further features of improvement contributing to the efficient operation of such a machine will be observed and readily understood from the following detailed description of a preferred embodiment of the invention in connection with the accompanying drawings in which:

Fig. 1 is a plan view of the complete machine including the rotating means for the drum and stirring shaft;

Fig. 2 is a side elevation of the machine shown in Fig. 1;

Fig. 3 is a longitudinal section view somewhat enlarged of the drum and stirring shaft;

Fig. 4 is a cross sectional view of the drum and shaft, as shown in Fig. 3;

Fig. 5 shows a detail of the connection between the stirrer shaft and one of the knife-like arms;

Fig. 6 is a section taken on the line A—A of Fig. 5;

Fig. 7 is a sectional view showing the connection between the knife-like arms and the knife strips, and Fig. 8 is a sectional view taken on the line B—B of Fig. 7.

In the drawings, 1 indicates the mixing chamber or drum of the machine through which extends a stirrer shaft 2 for carrying the mixing elements which are to be described. The drum 1 is supported at one end by a standard or machine support 3 having a journal 4 in its upper end for receiving an end of the shaft 2 and by another standard or machine support 5 at the other end of the drum for also carrying the shaft 2.

A journal 6 in the upper end of standard 5 receives a tubular shaft 7 which is connected to the adjacent end of the drum 1 by means of a bearing plate 8. At the other end of the drum 1 a similar bearing plate 9 rotatably supports the drum 1 on the shaft 2. The tubular shaft 7 has a bevel gear 10 keyed to its end so as to mesh with another bevel gear 11. This second bevel gear 11 also meshes with a bevel gear 12 at its opposite edge, the bevel gear 12 being concentric with bevel gear 10. From Fig. 1 it will be apparent that the shaft 2 extends through the tubular shaft 7 and the bevel gear 10 so as to provide a free end which is keyed to the bevel gear 12.

A stub shaft 13 extends from the bevel gear 11 at right angles to shaft 2 and is journaled at 14 on the support 5. A worm gear 15 is keyed to the other end of shaft 13 in driving relation with a worm 16. Conventional means, such as an electric motor 17 with suitable controls (not shown), is provided for driving the worm 16.

A removable section or cover 18 provides a rectangular opening for access to the drum 1.

A plurality of knife-like arms 19 are detachably connected to the shaft 2 at uniform intervals by means such as studs 20 extending through the shaft and nuts 21 (Fig. 6). The arms 19 extend for approximately the full length of the drum 1 in order that none of the material can escape cutting and an aeration. Each arm 19 is seated in a complemental recess 22 formed in shaft 2. As shown in Figs. 3 and 4, there are four sets of arms 19, the longitudinal axes of each set defining a plane which is radial to the shaft. Ninety-degree intervals separate each set of arms 19 in the embodiment which is illustrated. This staggered relationship of the arms 19 causes each of them to lie in a separate plane extending transversely of the stirrer shaft 2 and to operate in an individual mixing zone.

Figs. 3 and 4 illustrate the preferred amount of clearance between the extremities of the arms 19 and the inner face of the cylindrical drum 1. The arms move in such close proximity to the drum 1 that none of the dough batch will escape proper mixing or be allowed to adhere to said drum.

The arms 19 have the general shape of an isosceles triangle in cross section (Fig. 5) with a somewhat rounded leading edge 23. These leading or knife edges 23 all lie in the same plane in each set, and the edges 23 of the different sets of arms 19 all face in the same direction. As viewed in Fig. 4, all face counter-clockwise.

It will be seen from Fig. 3 that the ends of the radial arms 19 extend nearly to the inner periphery of the cylindrical drum 1. Close to the extremities of each set of arms a longitudinal knife strip 24 is secured so as to extend parallel to the adjacent portion of the drum 1, for substantially the full length thereof. Bolts 25 are utilized to attach the knives 24 in place. Each arm 19 is provided with a slot or recess 26 for receiving the knife 24, as shown in Figs. 7 and 8. The knives 24 have the same triangular cross section which has been described for the arms 19, and, while the leading edges of said knives project beyond the planes of the edges of the arms 19 of the different sets, they will lie in planes which are parallel thereto. Additional slots 27 are provided in the knives 24 in order that the bolts 25 may be counter-sunk below the knife edges.

Inwardly of the continuous knife strips 24 and parallel thereto, short knife segments 28 are rigidly attached to the arms 19 in the manner of said strip 24. These segment knives are also triangular in cross section and their edges with the edge of the adjacent continuous knife strip 24 define a plane parallel to and slightly in advance of the plane of the knife edges 23 of the respective sets of arms 19. This relationship is clearly disclosed in Figs. 3 and 4 of the drawings. The knife segments 28 are of equal length, namely, a little less than the distance separating the adjacent arms 19 of each set. The knives 28 are arranged to extend equal distances on either side of the arm 19 to which they are attached and with the continuous knives 24 provide three uniformly spaced rows of parallel knives extending longitudinally of the drum 1. Figs. 3 and 4 of the drawings show the preferred arrangement of the knives 24 and knife strips 28 outwardly of the mid-points of the arms 19.

From observations made of the machine of this invention in actual use, it has been determined that the most favorable results are obtained when the knife-like arms 19, strips 24, and strips 28 are not more than one-quarter inch in thickness at the base of their triangular cross sections; their width can be somewhat greater, as shown.

In Fig. 3 the disposition of the arms 19 of each set with respect to the stirring shaft 2 is clearly shown. Within the shaft interval defined by the adjacent arms 19 of any one set are the means for attaching one arm of each of the similar sets which have been described as being disposed at 90-degree intervals around the axis of the shaft 2. A uniform and balanced disposition of the knife arms 19 longitudinally and transversely of the shaft 2 is thus obtained.

Although there are but short spaces between the ends of the knife segments 28 in any one row, the spacing of the arms 19 constituting the next adjacent set will cause the knife segments 28 of that set to traverse the space which would otherwise be left untouched, as the shaft 2 and arms 19 revolve.

The drum 1, shaft 2, arms 19, and knife strips 24 and 28, as well as the connections which are used for these parts, are preferably made from a metal of the stainless variety in order that they can be kept clean with a minimum of difficulty.

In operating the mixing machine which has been described, the ingredients constituting the pie dough or like pastry are first inserted through the opening provided by the removable cover 18. By means which includes the motor 17 and the bevel gears 10, 11, and 12, the concentric shafts 2 and 7 which rotate the sets of arms 19 and the drum 1, respectively, are caused to turn with respect to each other in opposite directions. The motor 17 will be operated so that the shaft 2 and arms 19 will rotate in a counter-clockwise direction, as indicated by the arrow in Fig. 4 of the drawings. Simultaneously with this movement of the shaft 2, the drum 1 and its shaft 7 will be turned counter-clockwise by means of the bevel gears which have been described.

An opposed rotation of 28 to 30 revolutions per minute has been found the most efficient speed for operation. With the apparatus described and at this speed, it is possible to perfectly mix a pie dough in approximately one minute. Most of the mix will have a tendency to settle in the bottom of the drum where it will be constantly stirred and cut by succeeding sets of knife-like arms 19 and knives 24 and 28. Any material which is carried around with the drum 1 will be subjected to the same action as it falls across the different sets of arms 19 and knives 24, 28 on its way to the bottom of the drum.

Obviously various modifications in the form, proportions, and minor details of the presently described machine may be resorted to without departing from the principles of sacrificing any of the advantages of the invention which will be defined in the appended claims.

Having described the invention, what is claimed as new and desired to be secured by Letters Patent is:

1. A machine for making pie dough or the like comprising a rotatably mounted drum; a shaft extending longitudinally of the drum and being rotatable with respect thereto; a plurality of sets of knife-like arms uniformly spaced longitudinally of the shaft to which they are connected and extending in planes which are radial thereto, each arm having the shape of a triangle in cross section with one of the vertexes of the triangle as its leading edge; a continuous knife-like strip connected to each set of arms close to the extremities thereof with its knife parallel to the plane of the leading edges of said arms and similarly faced; rows of shorter knife-like strips connected to the arms and extending parallel to the continuous strips; and means for rotating the drum and shaft simultaneously in opposite directions for producing an aerated mixture of the ingredients constituting the dough.

2. In a pie dough making machine, a rotatably supported, cylindrical drum; a horizontal shaft extending axially through the drum and being rotatable with respect thereto, four detachable sets of knife-like, dough-cutting arms extending approximately the full length of the drum in uniformly spaced radial planes from the shaft nearly to the inner cylindrical surface of the drum and arranged to rotate with said shaft, said arms being spaced longitudinally of the shaft in staggered relationship such that no two arms will be in a single plane transverse to the axis of the shaft; a long knife-like strip spanning the ends of the arms of each set; two rows of short, knife-like strips connected individually to the arms of each set, two strips to each arm, in parallelism to the long strip of that set, each short strip extending on both sides of its arm to a point of close proximity with the adjacent short strip of its row, the long strip and short strips for each set of arms defining three rows which are substantially uniform in spacing and are disposed outwardly of the midpoints of the arms; and means for producing opposite rotation of the drum with respect to the arms and their attached strips, all of the knife edges of which face in the same rotational direction and are approximately one-quarter inch in thickness at the base.

JOSEPH MAST.